(12) United States Patent
Kim et al.

(10) Patent No.: US 7,995,160 B2
(45) Date of Patent: Aug. 9, 2011

(54) PRISM SHEET AND LIQUID CRYSTAL DISPLAY HAVING THE SAME

(75) Inventors: Heu-Gon Kim, Yongin-si (KR); Seong-Yong Hwang, Cheonan-si (KR); Kang-Woo Lee, Suwon-si (KR); In-Sun Hwang, Suwon-si (KR); Taek-Sun Shin, Asan-si (KR); Byung-Seo Yoon, Incheon (KR); Seul-Gi Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 132 days.

(21) Appl. No.: 12/388,482

(22) Filed: Feb. 18, 2009

(65) Prior Publication Data

US 2010/0053502 A1   Mar. 4, 2010

(51) Int. Cl.
G02F 1/1335 (2006.01)
(52) U.S. Cl. .......................................... 349/64; 362/620
(58) Field of Classification Search .................. 362/620, 362/626; 349/64
See application file for complete search history.

(56) References Cited

U.S. PATENT DOCUMENTS

| | | | | |
|---|---|---|---|---|
| 7,072,116 B2 * | 7/2006 | Okuwaki et al. | ............... | 359/599 |
| 7,530,719 B2 * | 5/2009 | Yamashita et al. | ............ | 362/600 |
| 7,543,973 B2 * | 6/2009 | Shimura | ...................... | 362/619 |
| 7,775,700 B2 * | 8/2010 | Lee | ............................... | 362/618 |

FOREIGN PATENT DOCUMENTS

| | | |
|---|---|---|
| JP | 06-0188879 | 1/1994 |
| JP | 09-105804 | 4/1997 |
| JP | 2007-041015 | 2/2007 |
| KR | 1020040079962 A | 9/2004 |
| KR | 1020050014880 A | 2/2005 |
| KR | 1020050043723 A | 5/2005 |
| KR | 10-2005-0054845 | 6/2005 |

* cited by examiner

*Primary Examiner* — Mark A Robinson
*Assistant Examiner* — Eric Wong
(74) *Attorney, Agent, or Firm* — Innovation Counsel LLP

(57) ABSTRACT

Disclosed are a prism sheet and a liquid crystal display having the same. The prism sheet includes a base and a plurality of prism mountains. The base includes a front surface and a rear surface facing the front surface. The prism mountains are integrally formed with the base on the rear surface of the base. At least one prism mountain includes a plurality of light incidence surfaces and a reflective surface. The light incidence surfaces receive light. The reflective surface is adjacent to one of the light incidence surfaces to reflect the light. A vertical angle of the prism mountains formed between the light incidence surface adjacent to the reflective surface and the reflective surface, is in a range of about 70° to about 100°.

19 Claims, 25 Drawing Sheets

PRISM SHEET AND LIQUID CRYSTAL DISPLAY HAVING THE SAME

CROSS-REFERENCE TO RELATED APPLICATION

This application relies for priority upon Korean Patent Application No. 2008-83455 filed on Aug. 26, 2008, the contents of which are herein incorporated by reference in their entirety.

BACKGROUND OF THE INVENTION

1. Field of the Invention

The present invention relates to a prism sheet and a liquid crystal display having the same. More particularly, the present invention relates to a prism sheet and a liquid crystal display having the same, capable of representing high light collecting efficiency.

2. Description of the Related Art

Recently, as various electronic appliances such as mobile phones, PDAs (Personal Digital Assistants), computers and large-scale televisions have been developed, demands for flat panel display devices applicable to the electronic appliances have been gradually increased.

The flat panel display devices, such as LCDs (Liquid Crystal Displays), PDPs (Plasma Display Panels), FEDs (Field Emission Displays), VFD (Vacuum Fluorescent Displays), EPDs (Electrophoretic Displays), and the like, have been actively studied. Among them, LCDs have been currently spotlighted in terms of mass production, simple driving scheme and high-quality images.

LCDs are display apparatuses using optical anisotropy of liquid crystals, and display images by controlling light transmittance of the liquid crystals using an electric field.

Such an LCD includes a liquid crystal panel to display an image. Since the liquid crystal panel is a non-emissive device, the LCD additionally requires a backlight unit to supply light to the liquid crystal panel.

The backlight unit includes optical sheets such as a diffusion sheet, a prism sheet, and a protective sheet to increase light transmittance of the liquid crystal panel. Recently, the diffusion sheet or the protective sheet has been removed from the backlight unit to reduce the manufacturing cost. However, if the optical sheet such as the diffusion sheet or the protective sheet is removed from the backlight unit, not only is there an increase in the loss of light according to exit angles of light output from a light guide plate, but a viewing angle may be expanded and brightness may be reduced. Accordingly, the structure of a prism sheet capable of raising light collecting efficiency by increasing brightness without degrading the viewing angle is required.

SUMMARY OF THE INVENTION

Therefore, the present invention provides a prism sheet capable of increasing light collecting efficiency by reducing light loss according to exit angles of light output from a light guide plate and increasing brightness without degrading a viewing angle.

The present invention also provides a liquid crystal display having the prism sheet.

In one aspect of the present invention, a prism sheet includes a base and a plurality of prism mountains. The base includes a front surface and a rear surface facing the front surface. The prism mountains are integrally formed with the base on the rear surface of the base. A refractive index of the prism mountain is preferably in the range of about 1.4 to about 1.7.

The prism mountains may extend in one direction, and an extension direction may be variably changed.

Each of the prism mountains includes a plurality of light incidence surfaces and a reflective surface. The light incidence surfaces receive light. The reflective surface is adjacent to the light incidence surface to reflect the light. A vertical angle of the prism mountains, which is an angle formed between the light incidence surface close to the reflective surface and the reflective surface, is in a range of about 70° to about 100°.

The light incidence surfaces may have two or more flat planes. In the case of the two or more flat planes, the light incidence surfaces include first and second light incidence surfaces. The first light incidence surface may be connected to the second light incidence surface while making contact with the second light incidence surface. In addition, the first light incidence surface may be connected to the second light incidence surface through a curved surface interposed between the first and second light incidence surfaces.

Assuming that an angle formed between the first light incidence surface and a straight line passing through an angular point of each prism mountain perpendicularly to the front surface is $\theta_{x1}$, an angle formed between the second light incidence surface and the straight line passing through the angular point of each prism mountain perpendicularly to the front surface is $\theta_{x2}$, and an angle formed between the reflective surface and the straight line passing through the angular point of each prism mountain perpendicularly to the front surface is $\theta_y$, the prism mountain satisfies $\theta_{x1} > \theta_{x2}$, and $\theta_{x1} > \theta_y$. The angle $\theta_{x2}$ is greater than or equal to about 0° and smaller than about 50°, and $\theta_y$ is preferably within a range of about 30° to about 34° in one example. The reflective surface may be a flat plane having a straight-line-shape profile, or may be a curved surface having a curvature within a range of about 30° to ∞.

The prism mountains may have various heights. In one example, the prism mountains have at least two heights different from each other. If the prism mountains have two heights different from each other, the prism mountains may be alternately aligned with each other.

The prism mountains may have at least two vertical angles different from each other. The prism mountains having the vertical angles may be alternately aligned with each other.

The base may be provided at the front surface thereof with curved patterns randomly arranged to have an irregular corrugated shape, or a plurality of protrusions extending in a direction different from an extension direction of patterns of the prism mountains formed on the rear surface. The protrusions may have a lenticular shape.

In another aspect of the present invention, a liquid crystal display includes the prism sheet. The liquid crystal display includes a liquid crystal panel, a light source, a light guide plate, and at least one prism sheet. The light source is provided at one side of a lower portion of the liquid crystal panel to output light. The light guide plate is provided at one side of the light source to guide the light to the liquid crystal panel. The prism sheet is provided above the light guide plate to collect the light.

The light guide plate includes a light exit surface, through which the light is output to the liquid crystal panel, and an opposing surface facing the light exit surface. A pattern, which scatters the light, is formed as at least a portion of one surface of the light exit surface and/or the opposition surface.

The pattern scattering the light may include a plurality of prism mountains extending in one direction.

A prism sheet according to the present invention can minimize light loss according to exit angles and increase brightness while ensuring a sufficient viewing angle. A diffusion sheet or a protective sheet used together with a conventional prism sheet can be omitted when using such a prism sheet, so that the prism sheet is advantageous in terms of economy.

Accordingly, the present invention provides a prism sheet capable of raising light collecting efficiency by increasing brightness without degrading a viewing angle and a high-quality liquid crystal display having improved brightness.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Figure 1:
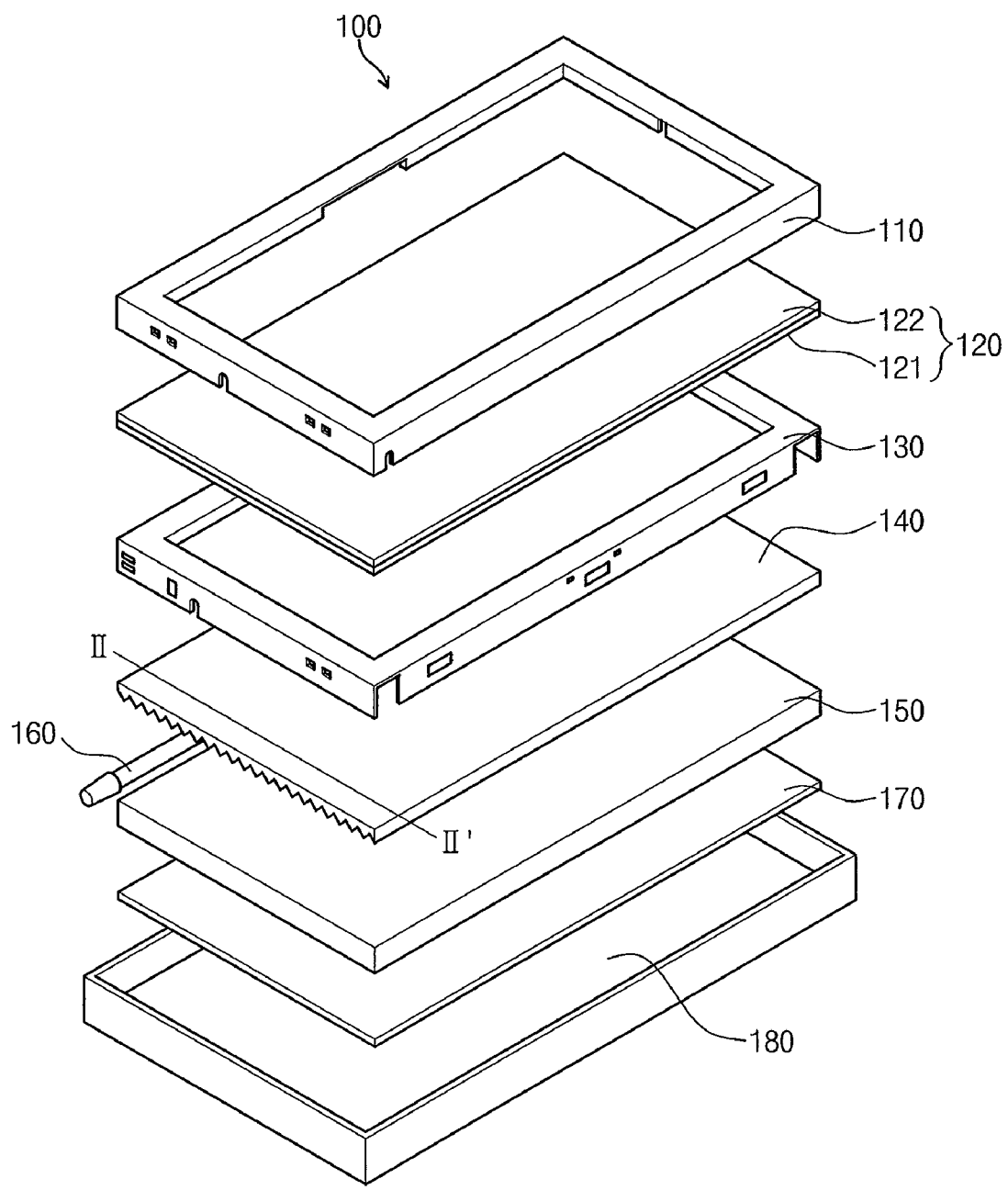
FIG. 1 is an exploded perspective view schematically showing an LCD according to an embodiment of the present invention.

Hereinafter, a liquid crystal display according to embodiments of the present invention will be described with reference to accompanying drawings. In the following description, a fluorescent lamp is employed as a light source. For example, the light source may employ an edge-illumination-type light source provided at one side of a liquid crystal panel. However, the present invention is not limited thereto, but may include various light sources such as a light emitting diode.

It is understood that the present invention should not be limited to the following embodiments but various changes and modifications can be made by one ordinary skilled in the art within the spirit and scope of the present invention. Meanwhile, elements shown in the drawings can be simplified or magnified for the purpose of clear explanation. In addition, the same reference numerals are used to designate the same elements throughout the drawings. In addition, on the basis of the liquid crystal panel, a direction through which light is output will be referred to as a front portion or an upper portion, and an opposite direction will be referred to as a rear portion or a lower portion for the purpose explanation.

FIG. 1 is an exploded perspective view showing an LCD 100 according to an embodiment of the present invention.

As shown in FIG. 1, the LCD 100 includes a liquid crystal panel 120, a mold frame 130, a prism sheet 140, a light guide plate 150, a light source 160, a reflective sheet 170, and upper and lower covers 110 and 180. The liquid crystal panel 120 forms an image. The mold frame 130 supports the edge of the liquid crystal panel 120. The prism sheet 140 is provided below the mold frame 130. The light guide plate 150 is provided below the prism sheet 140. The light source 160 is provided at one side of the light guide plate 150. The reflective sheet 170 is provided below the light guide plate 150. The upper and lower covers 110 and 180 are coupled with each other to receive the elements therein.

The upper cover 110 has a structure supporting an edge of a front surface of the liquid crystal panel 120. The upper cover 110 includes a display window exposing a display region of the liquid crystal panel 120. In addition, the upper cover 110 is provided at a lateral surface thereof with a screw hole (not shown) to be coupled with the lower cover 180.

The liquid crystal panel 120 has the shape of a rectangular plate with a longer lateral side and a shorter lateral side. The liquid crystal panel 120 includes a first substrate 121, a second substrate 122 facing the first substrate, and liquid crystals (not shown) interposed between the first substrate 121 and the second substrate 122. The first substrate and the second substrate may include a thin film transistor and a color filter, respectively. In this case, the first substrate and the second substrate are referred to as a thin film transistor substrate and a color filter substrate, respectively.

The first substrate includes a plurality of gate lines and data lines crossing each other in the form of a matrix to define pixels. The thin film transistor is formed near the intersection of the gate line and the data line in each pixel.

Although not shown, a printed circuit board connected to the thin film transistor of the liquid crystal panel 120 may be provided at one side of the liquid crystal panel 120. Signals transmitted from the printed circuit board are transmitted to the thin film transistor through interconnections, and the thin film transistor applies a voltage to the pixels according to the signals, thereby driving a liquid crystal layer.

The mold frame 130 is provided around the edge of the liquid crystal panel 120. The mold frame 130 substantially has the form of a quadrangular ring. The mold frame 130 supports the liquid crystal panel 120 and the prism sheet 140. If necessary, the mold frame 130 may be spaced apart from the prism sheet 140 by a predetermined distance to support the prism sheet 140. The mold frame 130 is coupled with the lower cover 180, to receive the prism sheet 140, the light guide plate 150, and the light source 160 therein.

The prism sheet 140 is interposed between the liquid crystal panel 120 and the light guide plate 150. The prism sheet 140 collects diffused light in a direction perpendicular to a flat plane of the liquid crystal panel 120, such that the diffused light is incident perpendicularly to the rear surface of the liquid crystal panel 120. In addition, the prism sheet 140 allows light passing therethrough to have uniform brightness distribution. The prism sheet 140 according to an embodiment of the present invention will be described later.

A diffusion sheet (not shown) may be interposed between the prism sheet 140 and the light guide plate 150 if necessary. The diffusion sheet diffuses light applied in one direction to provide uniform light brightness distribution.

The light guide plate 150 is provided below the rear surface of the liquid crystal panel 120 to guide light emitted from the light source 160 to the rear surface of the liquid crystal panel 120. The light guide plate 150 has a front surface and a rear surface opposing the front surface. The front surface is referred to as an exit surface, through which light is output to the liquid crystal panel 120, and the rear surface is referred to as an opposite surface. Light scatter patterns can be formed on at least one of the exit surface and the opposite surface. A plurality of light scatter patterns may be formed in various shapes. For example, the light scatter pattern may have a prism mountain shape or a lenticular shape extending in one direction from the exit surface or the opposite surface. In addition, the light scatter patterns can be randomly positioned with a semi-spherical shape or an oval shape. In one case, although the light scatter pattern may preferably have a plurality of prism mountains formed on the opposite surface of the light guide plate 150 such that light scattering efficiency and light guide efficiency can be simultaneously obtained, the present invention is not limited thereto. If necessary, the light scatter pattern may have various shapes.

Accordingly, the light guide plate 150 transforms light irradiated to a light incidence surface from the light source 160 provided adjacent to the light incidence surface into a planar light so that the light is uniformly transmitted to the liquid crystal panel 120.

In one example, the light guide plate 150 has a rectangular shape with a longer lateral side (e.g., horizontal side) and a shorter lateral side (e.g., vertical side).

Meanwhile, according to another embodiment, the light guide plate 150 may have a wedge shape, the width of which is reduced from one side to the other side of the light guide plate 150.

The light source 160 is provided at one side of the light guide plate 150, and may include a CCFL (Cold Cathode Fluorescence Lamp), an EEFL (External Electrode Fluorescence Lamp), or an LED (Light Emitting Diode). The reflective sheet 170 is provided below the light guide plate 150. The reflective sheet 170 reflects light, which is output downward through the light guide plate 150 from the light source 160, to the reflective sheet 170.

Figure 2:
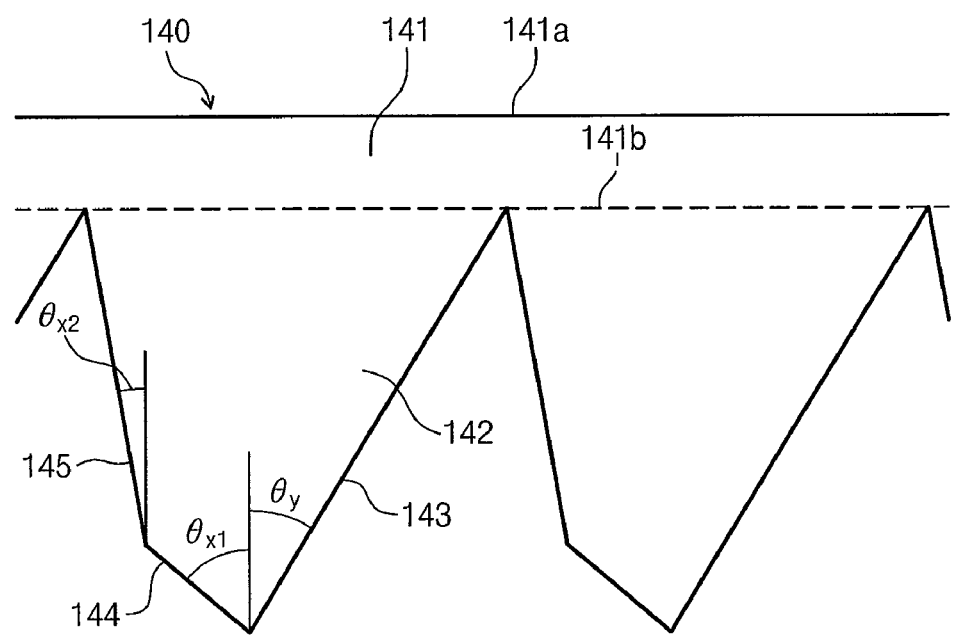
FIG. 2 is a section view showing a prism sheet according to a first embodiment of the present invention, and is a view taken along line II-II' of FIG. 1.
Figure 3A:
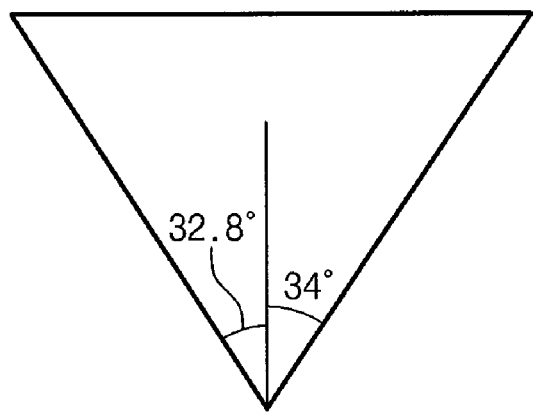
FIGS. 3A to 3C are sectional views showing first to third structures of a prism mountain according to the related art.
Figure 3B:
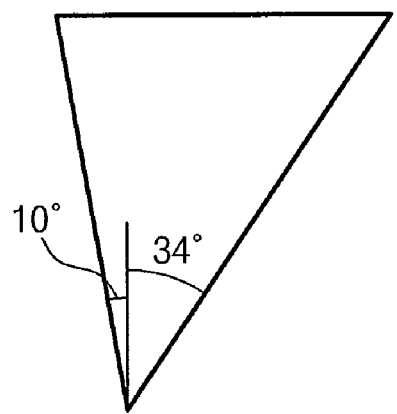
Figure 3C:
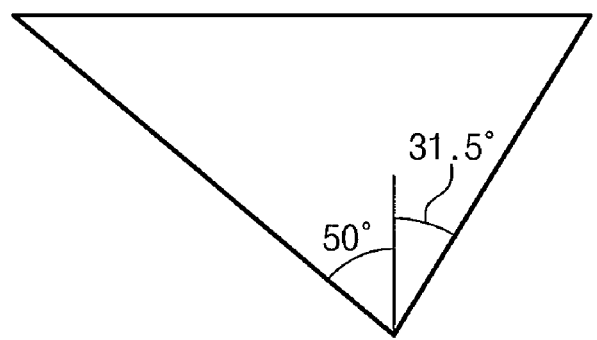
Figure 3D:
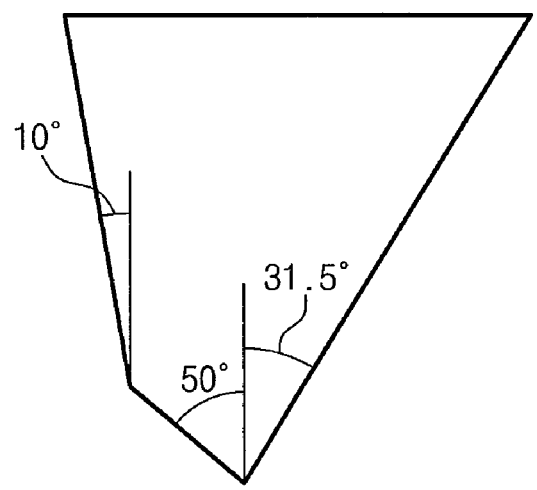
FIG. 3D is a section view showing a fourth structure of a prism mountain according to an embodiment of the present invention.
Figure 4A:
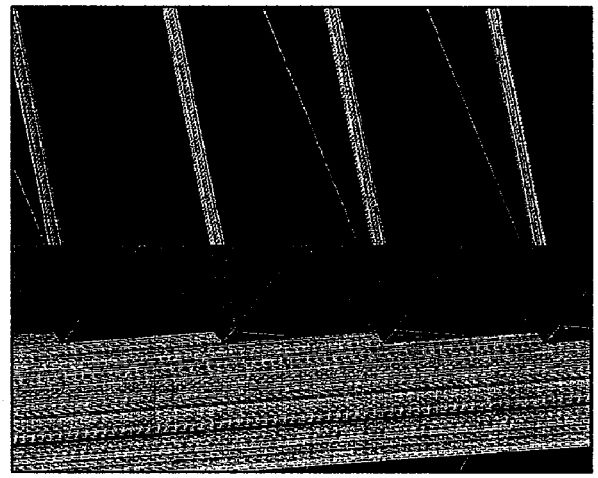
FIGS. 4A to 4E are photographs showing simulations for light collecting efficiency based on a prism sheet having an equilateral triangle-shape prism mountain having the first structure according to a conventional technology when an exit angle of light from a light guide plate is about 85°, about 74°, about 65°, about 55°, and about 45°, respectively.
Figure 4B:
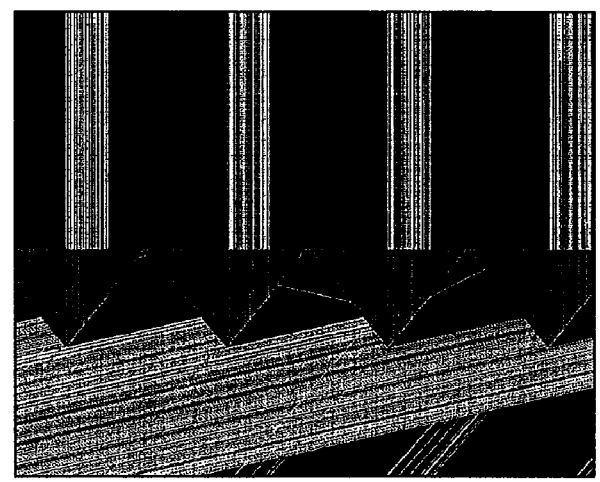
Figure 4C:
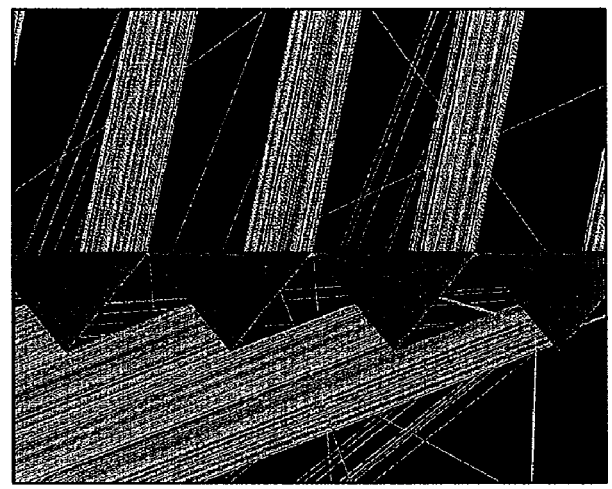
Figure 4D:
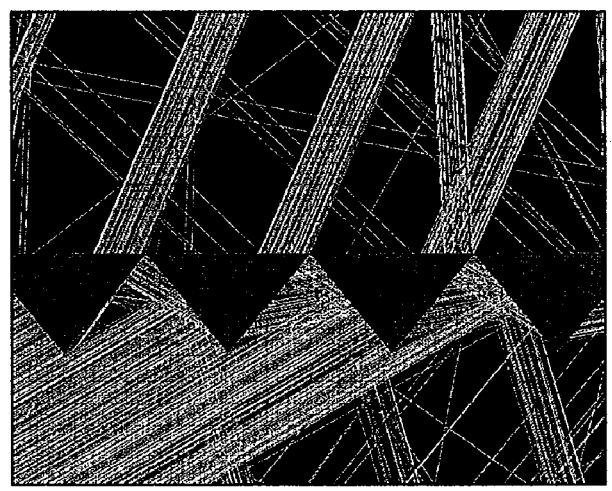
Figure 4E:
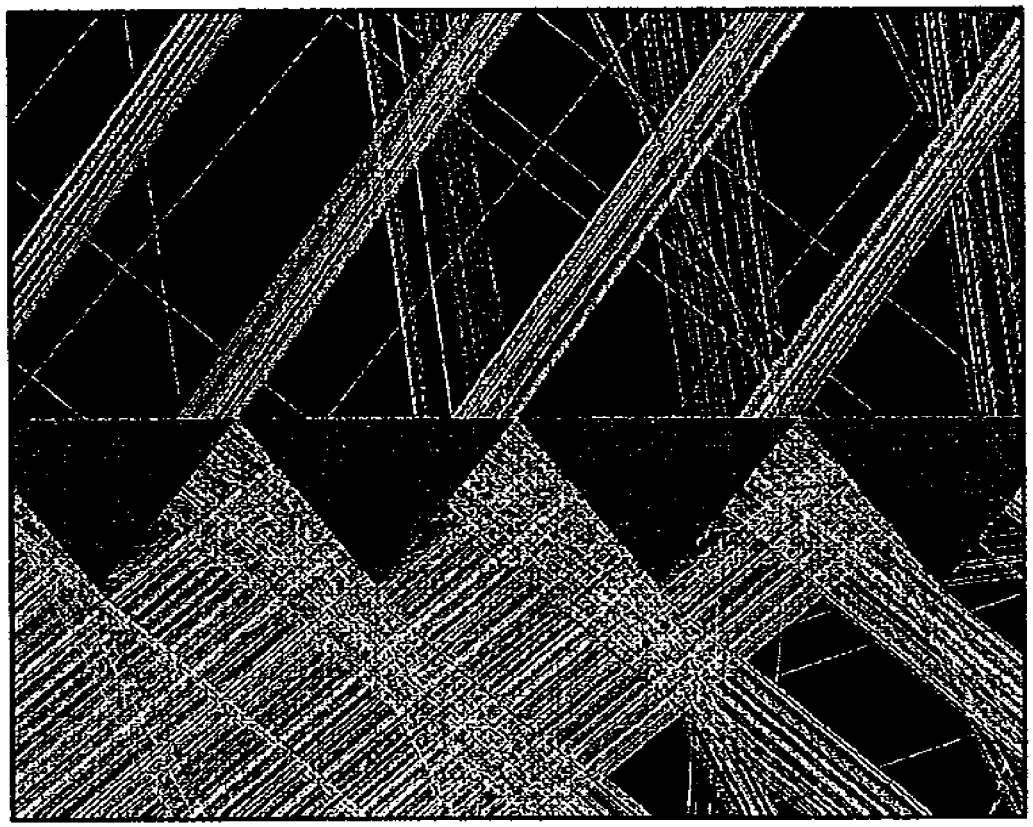

FIG. 2 is a perspective view showing the prism sheet 140 according to a first embodiment of the present invention, and is a view taken along line II-II' of FIG. 1.

As shown in FIG. 2, the prism sheet 140 according to an embodiment of the present invention includes a base 141 having a front surface 141a and a rear surface 141b facing the front surface 141a. The base 141 is provided at the rear surface 141b thereof with a plurality of prism mountains 142 integrally formed with the base 141.

The prism mountain 142 includes light incidence surfaces 144 and 145 receiving light emitted from the light source 160, and a reflective surface 143 reflecting light received through the light incidence surfaces 144 and 145. The light incidence surfaces 144 and 145 are connected to each other, so that the light incidence surface 144 close to the reflective surface 143 is connected to the reflective surface 143 to form a vertical angle or a peak angle of the prism mountain 142.

Referring to FIG. 1, the light source 160 is positioned at one side of a lower portion of the liquid crystal panel 120, and light emitted from the light source 160 is radiated in omnidirections. Meanwhile, the light guide plate 150 provided at one side of the light source 160 guides the light emitted from the light source 160 such that a large portion of the light is forwarded to the liquid crystal panel 120, that is, in a direction perpendicular to the rear surface 141b of the prism sheet 140. However, a portion of the light is incident onto the rear surface 141b of the prism sheet 140 at an acute angle about the rear surface 141b even though the light has passed through the light guide plate 150. On the assumption that an angle between light output from the light guide plate 150 and a straight line perpendicular to a top surface of the light guide plate 150 is referred to as an "exit angle" of the light guide plate 150, the exit angle of the light guide plate 150 may be mostly less than 45°.

The prism sheet 140 performs a light collection function such that light, which is not incident on the prism sheet 140 in a perpendicular direction to the prism sheet 140, has an exit angle of about 0° after the light has passed through the prism sheet 140. Light that has been incident onto the prism sheet 140 from the light guide plate 150 is received inside the prism mountain 142 through the light incidence surfaces 144 and 145, and then is reflected from the reflective surface 143 to be output to the front surface 141a of the prim sheet 140.

Preferably, the prism sheet 140 is comprised of a transparent material having a refractive index (n) in the range of about 1.4 to about 1.7 . In addition, a pitch of the prism mountains of the prism sheet 140 may be variously adjusted if necessary. Preferably, the prism mountains of the prism sheet 140 has a pitch in the range of about 30 μm to about 100 μm. More particularly, the prism sheet 140 has a pitch of about 50 μm in one example.

Although the prism mountain 142 may extend in one direction, the present invention is not limited thereto. For example, the prism mountain 142 may be curved. When the prism mountain 142 extends in the one direction, the extension direction of the prism mountain 142 can be variously adjusted according to a traveling path of output light. Preferably, the prism mountain 142 is provided in a direction perpendicular to the traveling path of the output light. In this case, the light can be supplied into the prism sheet 140 through the light incidence surfaces 144 and 145 as much as possible, so that the highest light collecting efficiency can be obtained.

The light incidence surfaces 144 and 145 include a plurality of flat planes such that light can be incident onto the prism sheet 140 at various angles. Although the prism sheet 140 having two flat planes of light incidence surfaces is shown in accompanying drawings, the present embodiment is not limited thereto. If necessary, the prism sheet 140 may have at least three flat planes of light incidence surfaces. The flat planes forming the light incidence surfaces 144 and 145 are adjacent to each other, and the ends of the adjacent light incidence surfaces 144 and 145 are connected to each other.

Hereinafter, when the light incidence surfaces 144 and 145 include two flat planes, a flat plane closest to the reflective surface 143 will be referred to as the first light incidence surface 144, and a flat plane spaced apart from the reflective surface 143 and adjacent to the first light incidence surface 144 will be referred to as the second light incidence surface 145.

In the prism sheets 140 according to an embodiment of the present invention, angles formed between the first and second light incidence surfaces 144 and 145 and between the first light incidence surface and the reflective surface 143 must be optimized such that light can be output in the forward direction substantially without light loss.

Hereinafter, a straight line passing through an angular point of the prism mountain 142 perpendicularly to the front surface 141a will be referred to as a "perpendicular straight line." On the assumption that an angle formed between the first light incidence surface 144 and the perpendicular straight line is $\theta_{x1}$, an angle formed between the second light incidence surface 145 and the perpendicular straight line is $\theta_{x2}$, and an angle formed between the reflective surface 143 and the perpendicular straight line is $\theta_y$, the angle $\theta_{x1}$ is greater than the angle $\theta_{x2}$. This represents that the first and second light incidence surfaces 144 and 145 may not be prepared as a single plane, but protrude outwardly.

An angle formed between the first light incidence surface 144 and the front surface 141a of the base 141 is smaller than an angle formed between the second light incidence surface 145 and the front surface 141a of the base 141, so that the first light incidence surface 144 can collect light output from the light guide plate 150 at a greater exit angle, and the second light incidence surface 145 can collect light output from the light guide plate 150 at a smaller exit angle. Accordingly, when compared to a light incidence surface employing a single plane, light output at various angles can be collected while minimizing light loss with the present disclosure.

In this case, an angle between the first light incidence surface 144 and the reflective surface 143 ($\theta_{x1}+\theta_y$), that is, a vertical angle is preferably in the range of about 70° to about 100°. In other words, the sum of the angles $\theta_{x1}$ and $\theta_y$ is in the range of about 70° to about 100°. In detail, when the prism sheet 140 having a refractive index in the range of about 1.4 to about 1.7 is employed, the vertical angle becomes the optimum angle allowing light to be incident through the first and second light incidence surfaces 144 and 145 and reflected from the reflective surface 143 to be output through the front surface 141a of the prism sheet 140 while minimizing light loss. If the vertical angle between the first light incidence surface 144 and the reflective surface 143 is smaller than about 70° or greater than about 100°, light loss may be increased.

The sum of the angles $\theta_{x1}$ and $\theta_y$ can have various values in the range of about 70° to about 100°. In this case, the angle $\theta_{x1}$ is preferably greater than the angle $\theta_y$ (i.e., $\theta_{x1}>\theta_y$), and the angle $\theta_y$ is preferably in the range of about 30° to about 34°. If the prism mountain 142 of the prism sheet 140 has a single value for the angle $\theta_y$, the angle $\theta_y$ more preferably is about 31.5°. The angle $\theta_{x1}$ may be changed according to the angle $\theta_y$, and the angle $\theta_{x1}$ may be in the range of about 36° to about 70° in one example.

The angle $\theta_y$ corresponds to an angle capable of reflecting light incident into the prism mountain 142 and then outputting as much light as possible to the front surface 141a of the base 141 of the prism sheet 140, and corresponds to an angle enabling the light to be collected such that light output to the front surface 141a has an exit angle of about 0°. If the angle $\theta_y$ is not in an appropriate range, the exit angle of the light output is shifted into +90° or −90°. Experimental result thereof will be described below with reference to FIG. 13. If the $\theta_y$ does not correspond to the above angle range, the amount of light, which is incident onto the first and second light incidence surfaces 144 and 145 and output to the front surface 141a while being reflected from the reflective surface 143, is reduced, and the amount of light, which is output out of the prism mountain 142 below the prism sheet 140 while being refracted through the reflective surface 143, is increased.

In this case, preferably, the angle $\theta_{x2}$ between the second light incidence surface 145 and the perpendicular straight line is preferably greater than or equal to about 0° and smaller than about 50°. More preferably, the angle $\theta_{x2}$ is in the range of 5° to 10°. This helps to collect light having a smaller exit angle from the light guide plate 150 (e.g., light having an exit angle in the range of about 30° to about 70°).

FIGS. 4A to 7E are photographs showing a simulation for light collecting efficiency according to exit angles of light from light guide plate 150 according to a conventional technology and an embodiment of the present invention. The shape of prism mountains of FIGS. 4A to 7E is shown in FIGS. 3A to 3D, and all prism mountains of an used prism sheet have a pitch of about 50 μm. For the convenience of explanation, FIGS. 3A to 3D show only one prism mountain except for a base of the prism sheet. However, it should be noted that the prism sheet includes a plurality of prism mountains in practice. Hereinafter, shapes of the prism mountains shown in FIGS. 3A to 3D will be designated as first to fourth structures, respectively, for the purpose of explanation.

In the first structure, on the assumption that an angle between a light incidence surface and a straight line passing through an angular point of the prism mountain perpendicularly to a front surface of the prism sheet is $\theta_x$, and an angle between a reflective surface and the straight line passing through the angular point of the prism mountain perpendicularly to the front surface of the prism sheet is $\theta_y$, the angle $\theta_x$ is about 32.8°, and the angle $\theta_y$ is about 34°.

FIGS. 4A to 4E are photographs showing simulations for light collecting efficiency based on a prism sheet having a triangle-shape prism mountain having the first structure according to the conventional technology when the exit angle of the light from the light guide plate is about 85°, about 74°, about 65°, about 55°, and about 45°, respectively.

In the second structure, on the assumption that an angle between a light incidence surface and a straight line passing through an angular point of the prism mountain perpendicularly to a front surface of the prism sheet is $\theta_x$, and an angle between a reflective surface and the straight line passing through the angular point of the prism mountain perpendicularly to the front surface of the prism sheet is $\theta_y$, the angle $\theta_x$ is about 10°, and the angle $\theta_y$ is about 34°.

FIGS. 5A to 5E are photographs showing simulations for light collecting efficiency based on a prism sheet having a prism mountain having the second structure according to the conventional technology when the exit angle of the light from the light guide plate is about 85°, about 74°, about 65°, about 55°, and about 45°, respectively.

In the third structure, on the assumption that an angle between a light incidence surface and a straight line passing through an angular point of the prism mountain perpendicularly to a front surface of the prism sheet is $\theta_x$, and an angle between a reflective surface and the straight line passing through the angular point of the prism mountain perpendicularly to the front surface of the prism sheet is $\theta_y$, the angle $\theta_x$ is about 50°, and the angle $\theta_y$ is about 31.5°.

FIGS. 6A to 6E are photographs showing simulations for light collecting efficiency based on a prism sheet including a prism mountain having the third structure similar to that of an embodiment of the present invention when the exit angle of the light from the light guide plate is about 85°, about 74°, about 65°, about 55°, and about 45°, respectively. As shown in FIGS. 6A to 6E, a single light incidence surface is employed.

In the fourth structure, the prism mountain according to the first embodiment of the present invention has an angle of about 81.5°. In detail, the prism mountain has angle $\theta_{x1}$ of about 50°, angle $\theta_y$ of about 31.5°, and angle $\theta_{x2}$ of about 10°.

FIGS. 7A to 7E are photographs showing simulations for light collecting efficiency based on the prism sheet 140 having the prism mountain 142 having the fourth structure according to an embodiment of the present invention when the exit angle of the light from the light guide plate 150 is about 85°, about 74°, about 65°, about 55°, and about 45°, respectively.

Figure 5A:
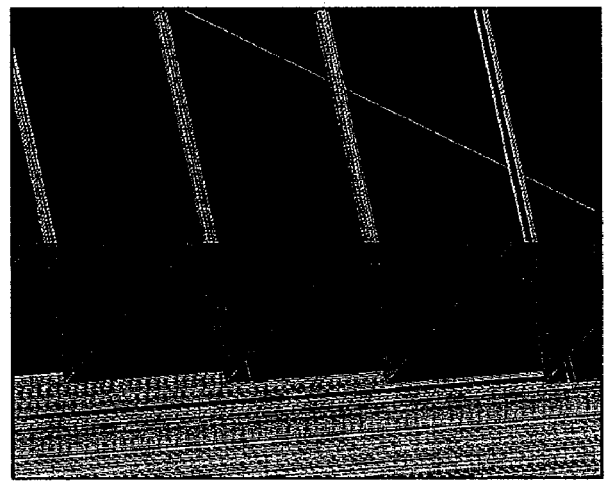
FIGS. 5A to 5E are photographs showing simulations for light collecting efficiency based on a prism sheet having a triangle-shape prism mountain having the second structure according to the conventional technology when the exit angle of the light from the light guide plate is about 85°, about 74°, about 65°, about 55°, and about 45°, respectively.
Figure 5B:
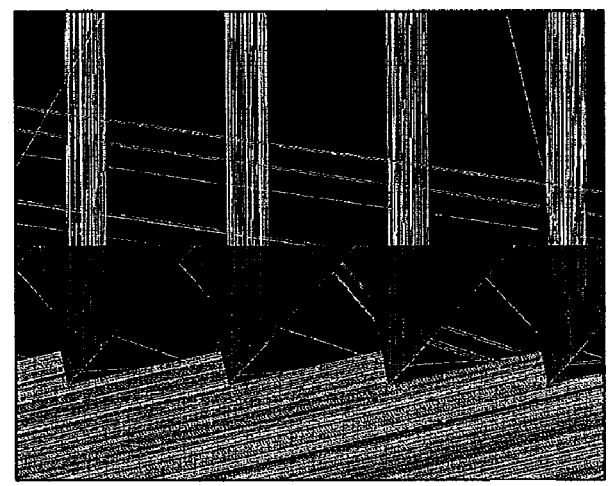
Figure 5C:
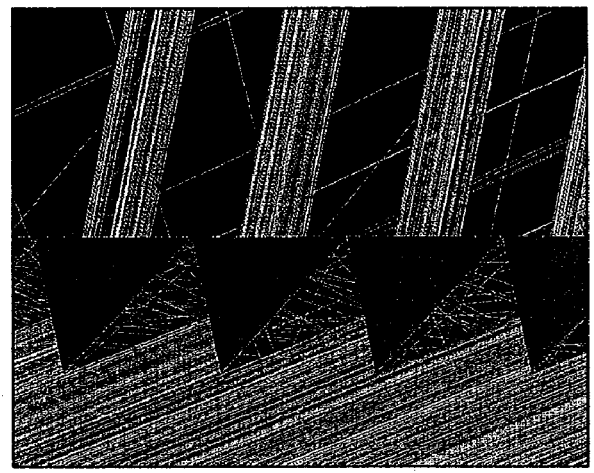
Figure 5D:
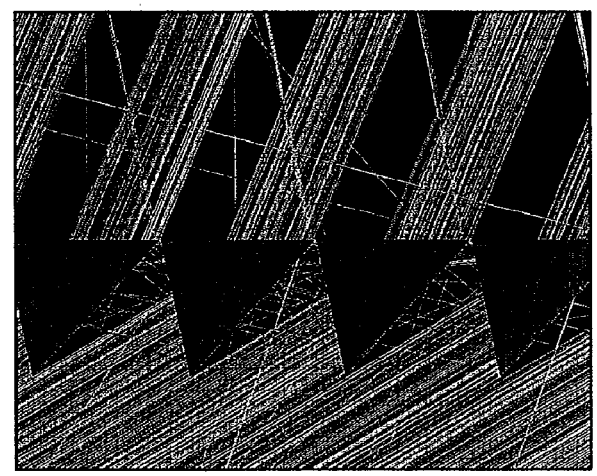
Figure 5E:
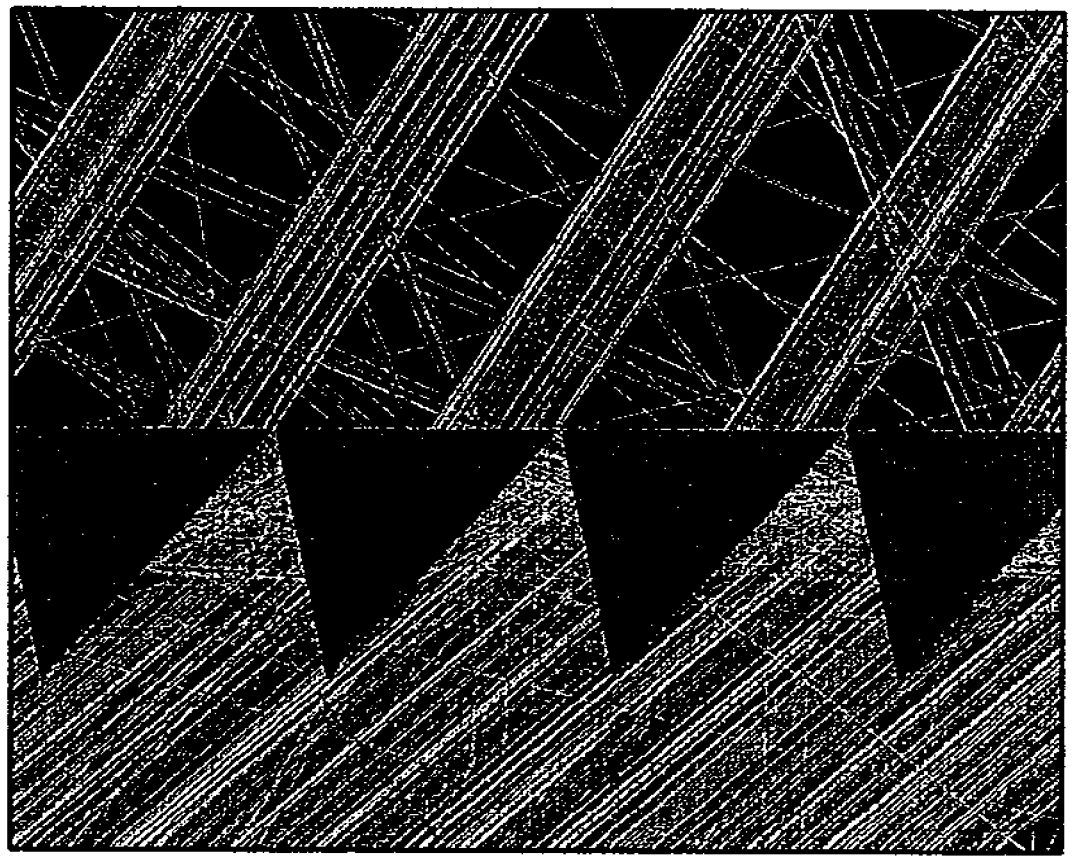
Figure 6A:
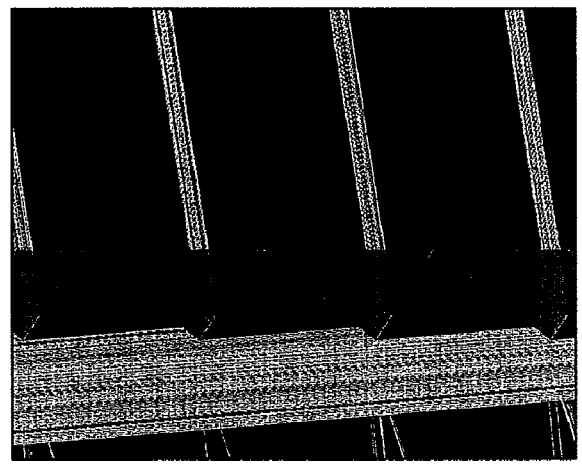
FIGS. 6A to 6E are photographs showing simulations for light collecting efficiency based on a prism sheet having a prism mountain having the third structure similar to that of one embodiment of the present invention when the exit angle of the light from the light guide plate is about 85°, about 74°, about 65°, about 55°, and about 45°, respectively.
Figure 6B:
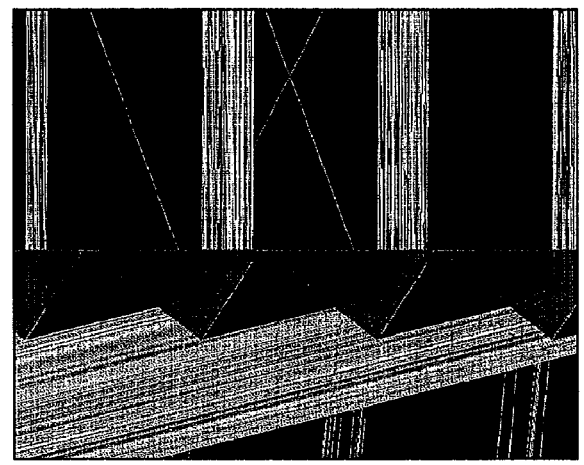
Figure 6C:
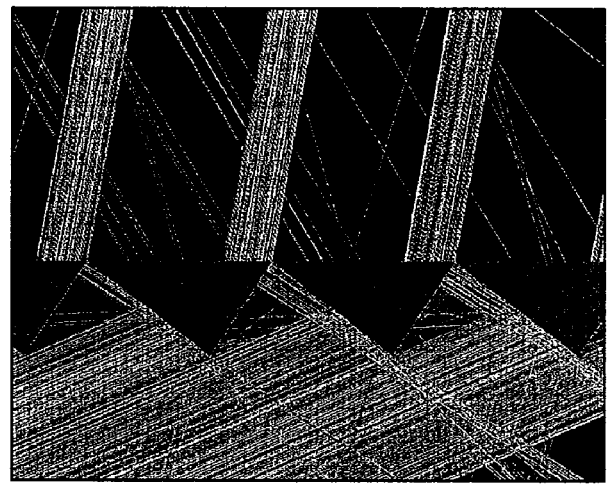
Figure 6D:
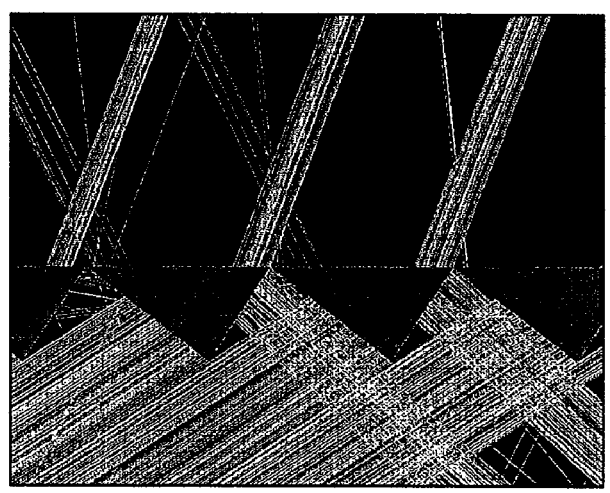
Figure 6E:
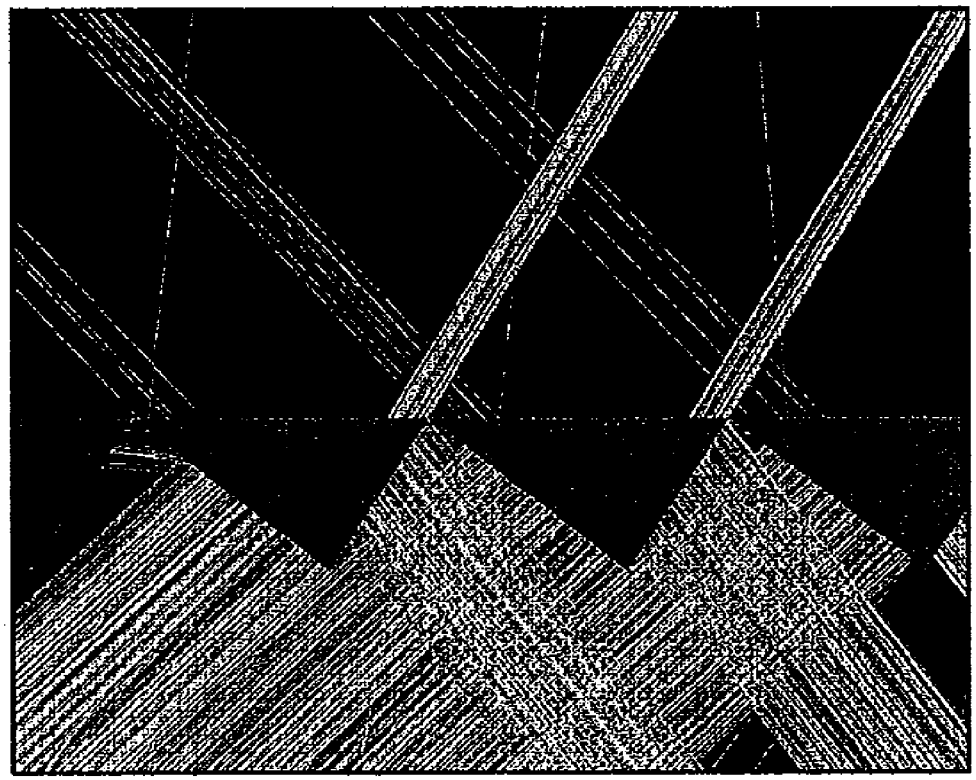
Figure 7A:
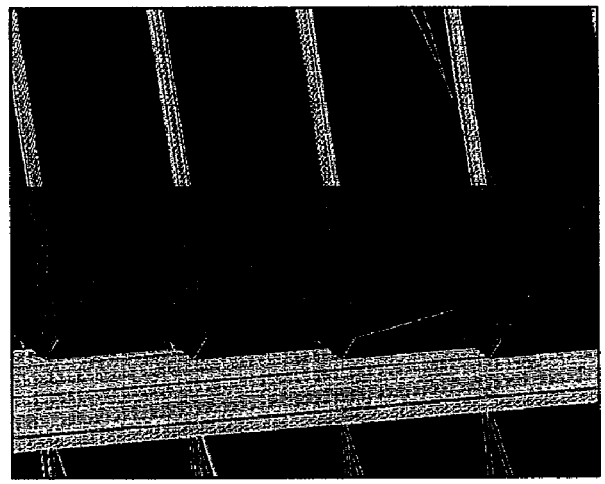
FIGS. 7A to 7E are photographs showing simulations for light collecting efficiency based on a prism sheet which has a prism mountain having the fourth structure according to one embodiment of the present invention when the exit angle of the light from the light guide plate is about 85°, about 74°, about 65°, about 55°, or about 45°.
Figure 7B:
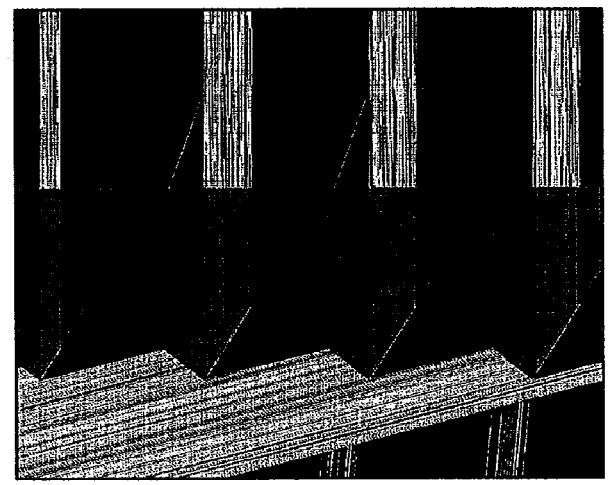
Figure 7C:
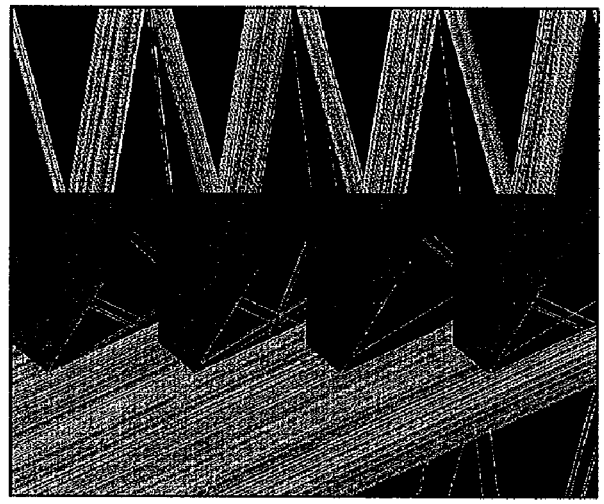
Figure 7D:
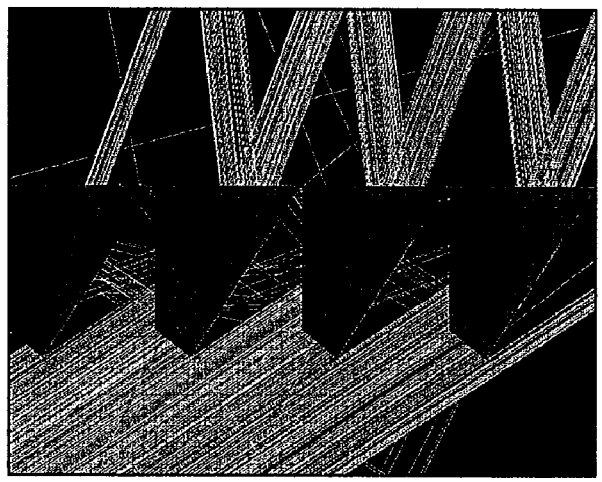
Figure 7E:
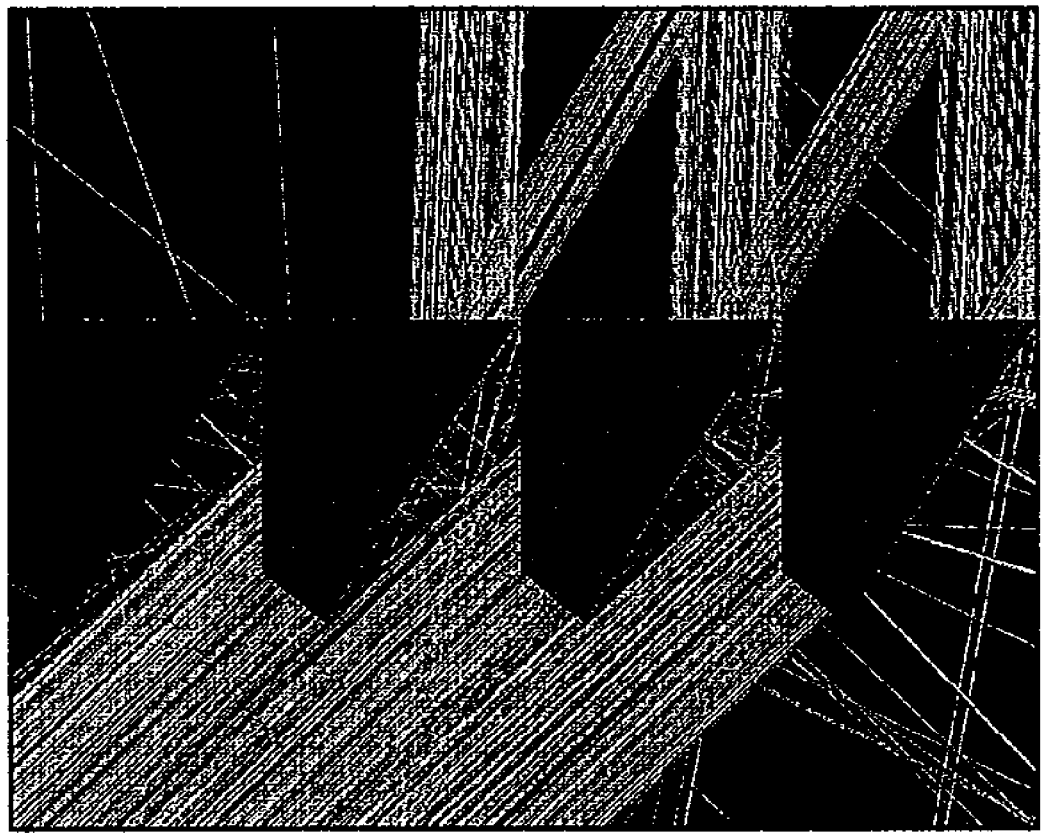

Referring to FIGS. 4A to 5E, when light is collected by using the prism mountain having the first structure or the second structure representing the structure of the conventional prism sheet, and when the exit angle of the light from the light guide plate becomes smaller than or equal to about 60°, a portion of the light is output in a rear surface direction of the prism sheet instead of being output to a front surface of the prism sheet. Accordingly, light loss may be caused. As shown in FIGS. 4A to 4E, when the exit angle of the light from the light guide plate is about 55° or about 45°, light output downward through the prism sheet is observed. As shown in FIG. 5E, when the exit angle of the light from the light guide plate is about 45°, light output downward through the prism sheet is observed.

In addition, referring to FIGS. 6A to 6E showing the third structure, when the exit angle of the light from the light guide plate is smaller than or equal to about 65°, a great amount of light output downward through the prism sheet is detected, so that light loss can be observed. This is because an angle of the light incidence surface about a straight line perpendicular to the rear surface and an angular point of the prism mountain is about 50°, so that light having a small exit angle from the light guide plate cannot be effectively collected.

In contrast, referring to FIGS. 7A to 7E showing a simulation result for the fourth structure according to the first embodiment of the present invention, light output downward through the prism sheet 140 rarely exists with respect to all angles. Therefore, light loss is rarely caused. This is because the first and second light incidence surfaces 144 and 145 having different angles are formed to collect all light received at different angles from the light guide plate 150.

FIGS. 8A to 8E are views showing a light distribution simulation when a prism sheet is not used and a light distribution simulation when light has passed through the prism sheets having the first structure to the fourth structure. The results of the light distribution simulations shown in FIGS. 8A to 8E are shown through a graph of FIG. 9. The light distribution simulation shows intensity of light using various gray scales according to angles in the range of left −90° to right +90°.

Figure 8A:
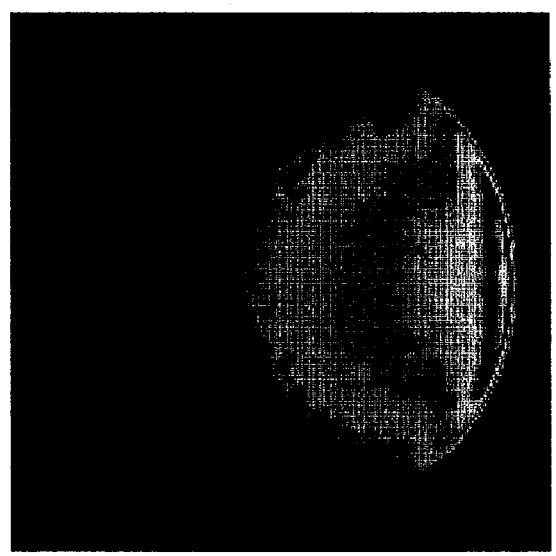
FIGS. 8A to 8E are views showing light distribution simulations when a prism sheet is not used and when light has passed through a prism sheet having the first to fourth structures.
Figure 8B:
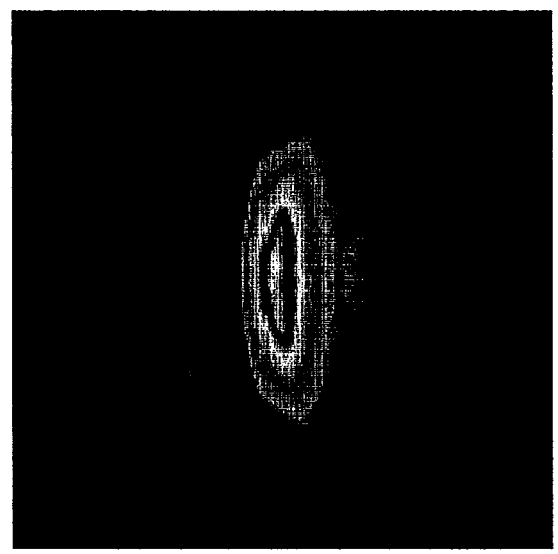
Figure 8C:
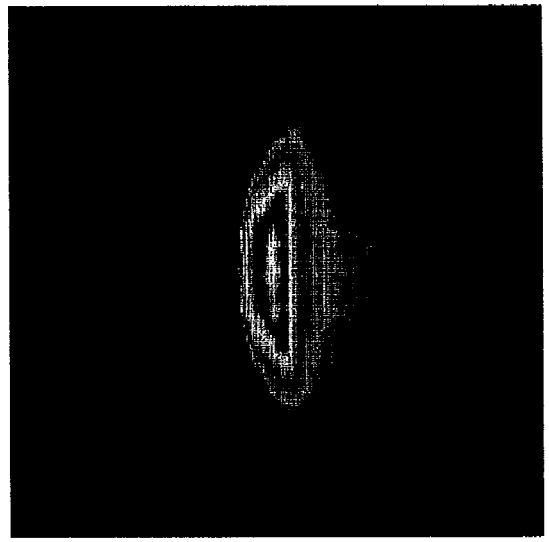
Figure 8D:
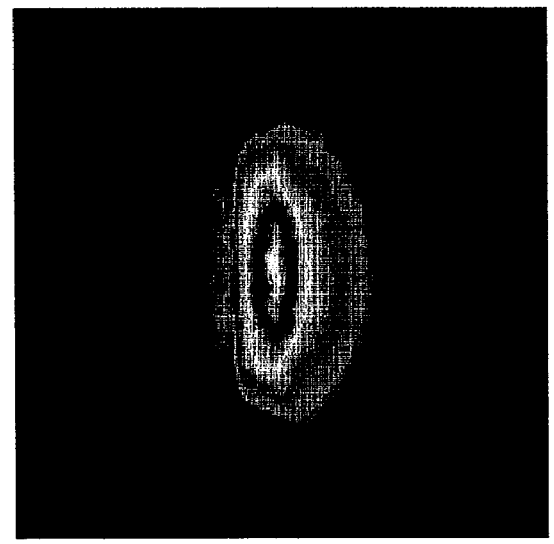
Figure 8E:
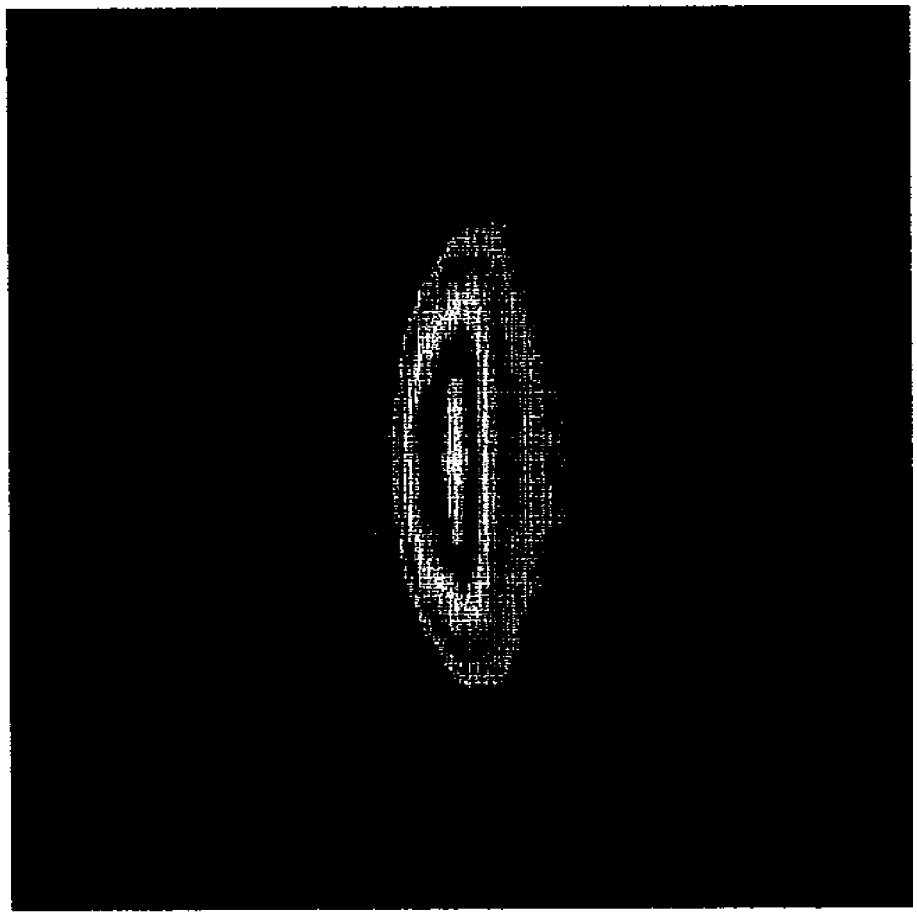
Figure 9:
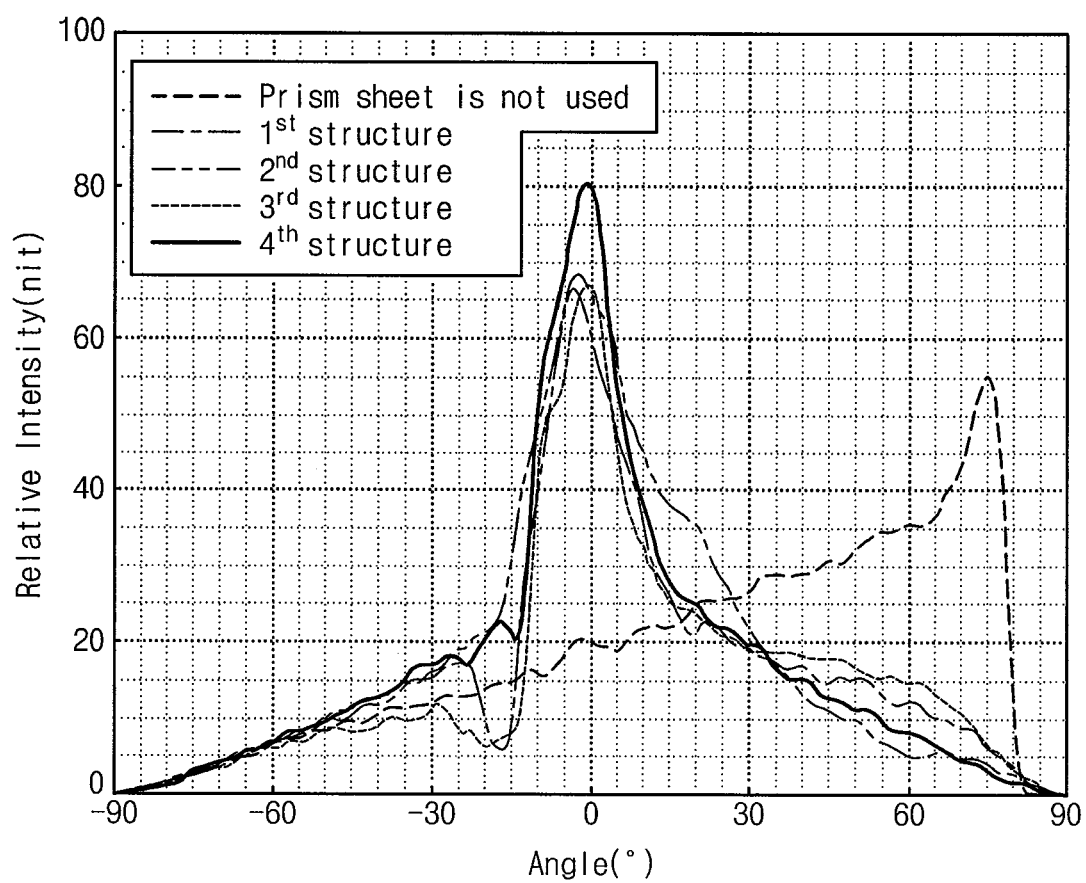
FIG. 9 is a graph showing results of the light distribution simulations of FIGS. 8A to 8E

Referring to FIGS. 8A to 8E and 9, FIG. 8A shows the light distribution simulation when the prism sheet is not used, and exhibits that most of the light is output in the direction of +90°. In contrast, FIGS. 8B to 8D show that light is output at the center of the light distribution simulation, that is, in the direction of about 0°, and exhibit that the light represents fine differences in intensity. As shown in FIG. 9, a horizontal axis represents an angle of light output from the light guide plate, and a vertical axis represents a relative brightness ratio of the light.

Referring to FIG. 9, when a prism sheet is not used, the intensity of light having an exit angle of about 60° or more is relatively very high. It is noted that the intensity of light having an exit angle of substantially 90° is high in practice. As an exit angle is gradually increased, an incidence angle about a rear surface of a liquid crystal panel is reduced, so that brightness is reduced.

In contrast, when the prism sheets having the first to fourth structures are used, the intensity of light having an exit angle of about 0° from the light guide plate is increased due to light collecting efficiency derived from the prism sheet.

When comparing a brightness level with the prism sheets having the first to fourth structures, the prism sheets having the first structure to the fourth structure have brightness of 100.0%, 102.6%, 100.3%, and 120.7%, respectively, on the assumption that brightness is 100.0% when the prism sheet is not used. In other words, brightness according to the first embodiment of the present invention is increased by about 20% when compared with the prism sheets having the first and second structures according to the related art or that of the prism sheet having the third structure with one light incidence surface, which is similar to that of the present invention.

Figure 13:
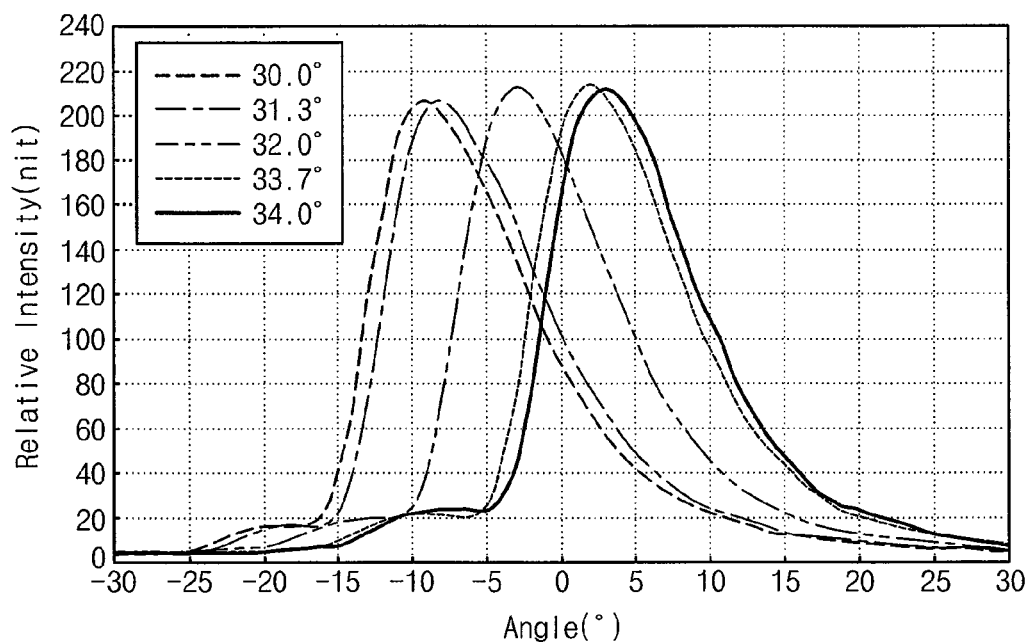
FIG. 13 is a graph showing a result of a light distribution simulation when light has been passed through a prism sheet including a prism mountain having a single angle.

In addition, a half-intensity angle obtained by transforming the curves of FIG. 13 into curves of normal distribution is about 20° in the first structure, about 34° in the second structure, about 18° in the third structure, and about 20° in the fourth structure. The half-intensity angle represents 50% of an exit angle. Accordingly, light of the first to fourth structures may generate similar viewing angles.

In other words, the prism sheet having the fourth structure according to the present embodiment has a half-intensity angle identical to that of the prism sheet having the conventional structure. Accordingly, even through the prism sheet according to the present embodiment has a half-intensity angle identical to that of the conventional prism sheet, brightness is increased by about 20%.

As described above, the prism sheet according to an embodiment of the present invention minimizes light loss according to exit angles, sufficiently ensures a viewing angle, and increases brightness. Therefore, when such a prim sheet according to an embodiment of the present invention is used, a diffusion sheet or a protective sheet used together with the conventional prism sheet is removed, so that the prism sheet according to an embodiment of the present invention is advantageous at least in terms of cost.

The prism sheet having the above vertical angle range improves a product yield in the manufacturing process as compared with that of the conventional prism sheet having a narrow vertical angle range. When the prism sheet is fabricated, after a press plate having an engrave part corresponding to a prism mountain of the prism sheet is provided above a prism sheet material and compressed, the press plate is separated from the resulting structure. Accordingly, if the vertical angle is enlarged, the prism sheet can be easily separated from the press plate for the pattern of the prism sheet, and any damage to the vertical angle of the prism mountain is reduced.

Hereinafter, various further embodiments of the present invention will be described, and only parts of the embodiments having features different from those of the first embodiment will be described in order to avoid redundancy.

Figure 10:
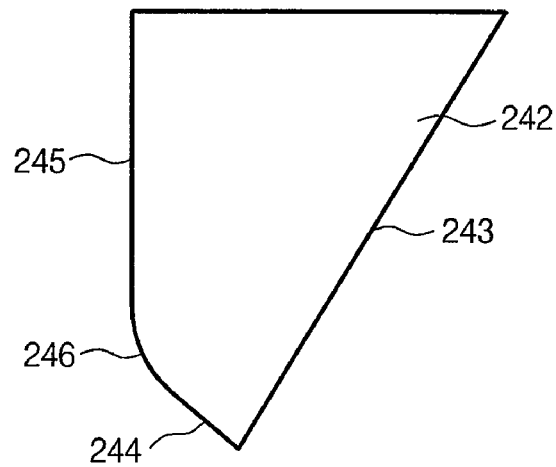
FIG. 10 is a sectional view showing a portion of a prism sheet according to a second embodiment of the present invention.

FIG. 10 is a sectional view showing a portion of a prism sheet according to a second embodiment of the present invention. For purposes of explanation, a base of the prism sheet is omitted, and only a single prism mountain is shown in FIG. 10, although a base is normally provided.

The prism sheet according to the second embodiment of the present invention includes a first light incidence surface 244 connected to a reflective surface 243 and a second light incidence surface 245. The first and second light incidence surfaces 244 and 245 include a flat plane, and interpose a curved surface 246 therebetween.

Two opposite ends of the curved surface 246 are connected to one end of the first light incidence surface 244 and one end of the second light incidence surface 245, so that the two light incidence surfaces 244 and 245 are connected to each other. Accordingly, light, which has various angles and has not been incident onto the first and second light incidence surfaces 244 and 245, is additionally incident onto the prism sheet through the curved surface 246. In particular, since a portion of light having a threshold angle or more about the first and second light incidence surfaces 244 and 245 is incident through the curved surface 246, light loss can be reduced as much as possible.

Figure 11:
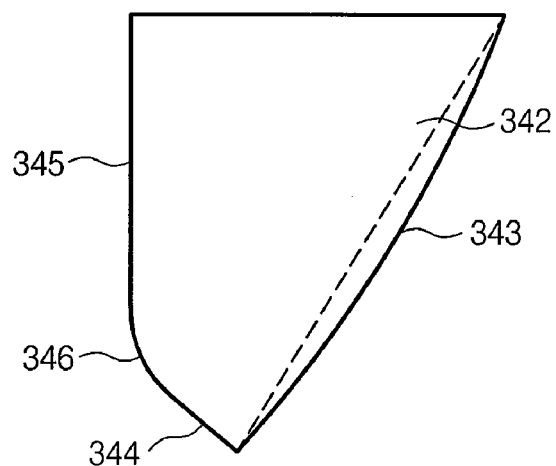
FIG. 11 is a sectional view showing a prism sheet according to a third embodiment of the present invention.

FIG. 11 is a sectional view showing a prism sheet according to a third embodiment of the present invention.

The prism sheet according to the third embodiment of the present invention has a reflective surface 343 that has a curved surface. The reflective surface 343 has a curvature in the range of about 30 to ∞. The reflective surface 343 having a curved surface can reflect light at various angles as compared to a reflective surface having a flat plane. Accordingly, an amount of light that is refracted and transmitted instead of being reflected from the reflective surface 343 is reduced, so that light collecting efficiency can be raised. According to the present embodiment, first and second light incidence surfaces 344 and 345 have a flat plane, and are adjacent to each other while interposing a curved surface 346 therebetween, similar to the second embodiment. However, similarly to that of the first embodiment, the first light incidence surface 344 may be directly connected to the second light incidence surface 345 without using the curved surface 346.

According to another embodiment, various prism sheets are employed such that a plurality of prism mountains thereof have two or more vertical angles formed between a light incidence surface adjacent to a reflective surface and the reflective surface.

Figure 12:
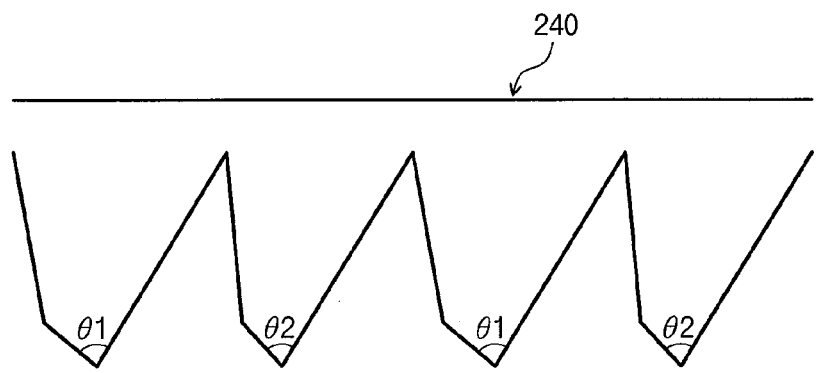
FIG. 12 is a sectional view showing a prism sheet according to a fourth embodiment of the present invention.

FIG. 12 is a sectional view showing a prism sheet including a plurality of prism mountains, which have two different vertical angles and are alternately aligned, according to a fourth embodiment of the present invention. As shown in FIG. 12, the vertical angles of the prism mountains have two angles $\theta_1$ and $\theta_2$ different from each other, according to the present embodiment. Although FIG. 12 shows that the prism mountains having different vertical angles are alternately aligned, the present invention is not limited thereto. If necessary, the prism mountains may have more than two different vertical angles and may be repeatedly arranged in various schemes or randomly arranged.

The prism sheet including the prism mountains having different vertical angles has a half-intensity angle greater than that of a prism sheet including a prism mountain having a single angle, so that a viewing angle can be improved.

FIG. 13 is a graph showing a result of a light distribution simulation of light that has been passed through a prism sheet including a prism mountain having a single angle. A horizontal axis of the graph represents an exit angle of light output from a light guide plate, and a vertical axis of the graph represents a relative intensity of the light. In this case, the relative intensity is observed by fixing angles $\theta_{x1}$ and $\theta_{x2}$ to about 50° and about 10°, respectively, and varying angle $\theta_{y1}$ to 30.0°, 31.3°, 32.0°, 33.7°, or 34.0° in the prism mountain. As described above, when the angle $\theta_{y1}$ is varied, an angle of light output to a front surface of the prism sheet is changed. As the $\theta_{y1}$ is increased, the angle of the light approximates from −90° to +90°. However, as shown in FIG. 13, the prism sheet having a signal vertical angle has a half-intensity angle of about 13°, and this half-intensity angle of about 13° may be narrower than a half-intensity angle of 21° required to use a liquid crystal panel.

Figure 14:
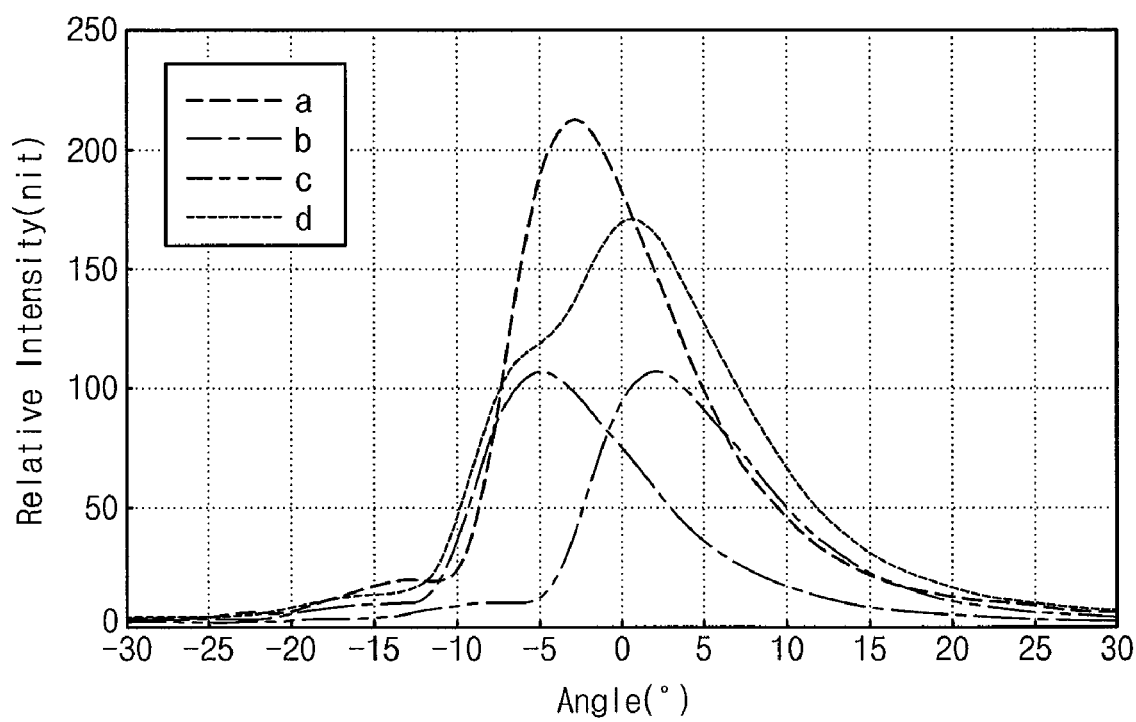
FIG. 14 is a graph showing curves a and b representing a light output simulation for prism sheets including prism mountains having a single angle of $\theta_y$ of about 31.3° or about 33.7°, curve c representing a light output simulation for a prism sheet including prism mountains having two vertical angles of about 31.3° and about 33.7°, and curve d representing a light output simulation for a prism sheet having a vertical angle of about 32°.

Therefore, according to the present invention, a viewing angle can be improved by combining two or more different vertical angles. FIG. 14 is a graph showing curves a and b representing a light output simulation in a prism sheet including prism mountains having a single vertical angle ($\theta_y$) of about 31.3° or about 33.7°, and curve c representing a light output simulation in a prism sheet including prism mountains having two vertical angles of about 31.3° and about 33.7°. The curve c represents a case in which the prism mountains having two vertical angles of about 31.3° and about 33.7° are alternately aligned with each other at a ratio of 1:1. For reference, curve d represents a light output simulation of a prism sheet having a single vertical angle of about 32°.

As shown in FIG. 14, in curve c for the prism mountains alternately having two vertical angles, a half-intensity angle corresponds to 17° or more, so that a viewing angle can be improved.

The vertical angle of the prism mountain is adjusted through the above method, so that the whole exit angle distribution is adjusted to a desired form, so that a viewing angle can be improved.

Figure 15:
FIG. 15 is a sectional view showing a prism sheet according to a fifth embodiment of the present invention.

FIG. 15 is a sectional view showing a prism sheet according to a fifth embodiment of the present invention. According to the fifth embodiment of the present invention, prism mountains have two or more different heights. The height of the prism mountains is variably adjusted. In other words, the height of the prism mountains may have a repeated value or a random value.

According to the present embodiment, as shown in FIG. 15, the prism mountains are fabricated to have various heights, so that the prism sheet uniformly makes contact with the light guide plate 150 provided at a lower portion of the prism mountain to increase light uniformity. Otherwise, a portion of the prism mountain may be stuck on the light guide plate 150 when the prism mountain has a single height, which may reduce light uniformity between the light guide plate 150 and the prism sheet.

Figure 16:
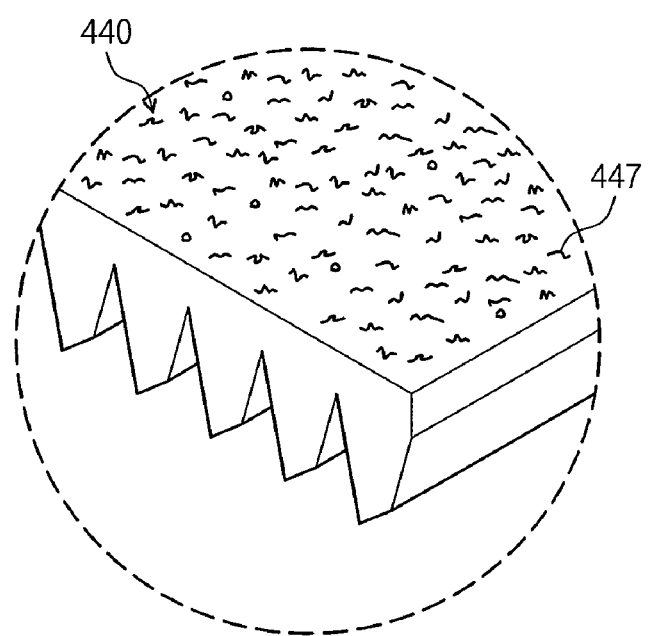
FIG. 16 is a perspective view showing a prism sheet according to a sixth embodiment of the present invention.

FIG. 16 is a perspective view showing a prism sheet according to a sixth embodiment of the present invention.

According to the sixth embodiment of the present invention, curved patterns 447 are randomly arranged on a front surface 440 of the prism sheet and irregular concave-convex shape. The curve patterns 447 control the scattering degree of light passing through the prism sheet within a predetermined range.

In the prism sheet according to the sixth embodiment of the present invention, a plurality of protrusions extending in a direction different from the one direction are additionally provided on the front surface 440 of a base.

Figure 17:
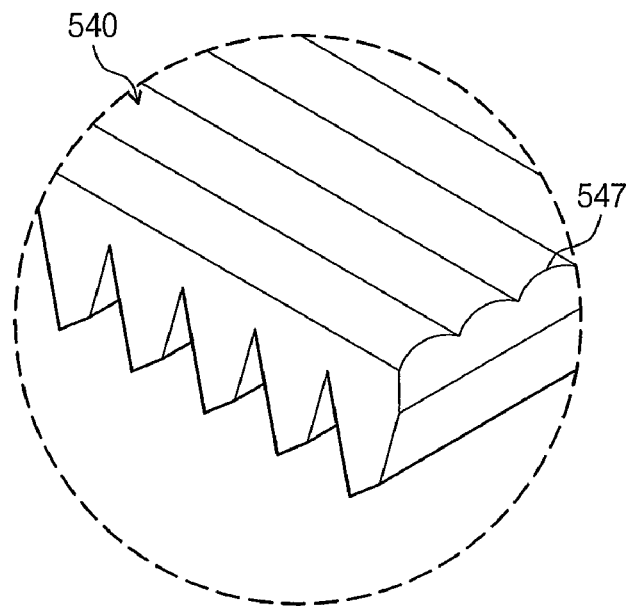
FIG. 17 is a perspective view showing a prism sheet according to a seventh embodiment of the present invention.

FIG. 17 shows a prism sheet according to a seventh embodiment of the present invention including a base provided at a front surface 540 thereof with protrusions 547 extending in a direction opposite to the one direction. The protrusions 547 may extend from the front surface 540 of the prism sheet in a direction different from an extension direction of a prism mountain formed on a rear surface of the prism sheet. The protrusion 547 extending from the front surface 540 of the prism sheet may have a profile in the shape of a polygon such as a triangle or a rectangle. In addition, the protrusion 547 can be configured to have a portion of a circular shape or an oval shape. For example, the protrusion 547 may have a lenticular shape. The extension direction of the lenticular shape may be perpendicular to an arrangement direction of the prism mountains. In addition, the protrusion 547 may have a polygonal profile such as a triangular profile or a rectangular profile as well as the lenticular shape.

The prism sheet can have protrusions in the lenticular shape such that the protrusions adjust the scattering degree of light passing through the prism sheet within a predetermined range.

In addition, the protrusions 547 can be prepared as a plurality of embossing patterns having a spherical shape or an oval shape. The embossing patterns may be formed uniformly or randomly.

Figure 18:
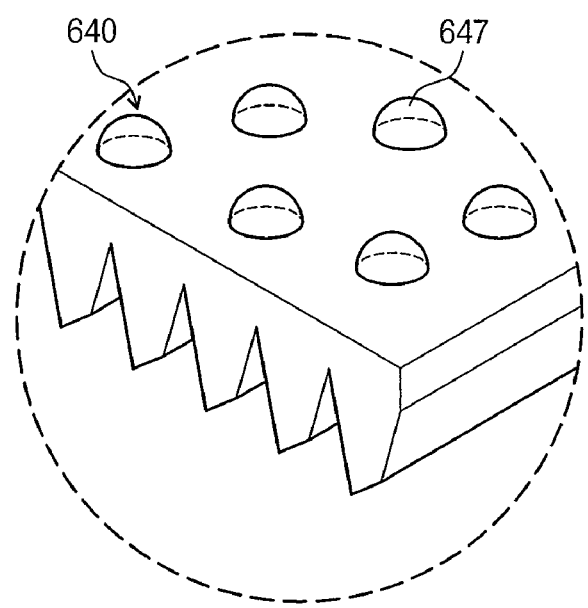
FIG. 18 is a perspective view showing a prism sheet according to an eighth embodiment of the present invention.

FIG. 18 shows a prism sheet 640 having semi-spherical embossing patterns 647 randomly arranged according to an eighth embodiment of the present invention. Referring to FIG. 18, the semi-spherical patterns 647 are randomly arranged on a front surface of a base of the prism sheet 640.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A prism sheet comprising:
a base including a front surface and a rear surface facing the front surface; and
a plurality of prism mountains integrally formed with the base on the rear surface of the base,
wherein at least one of the plurality of prism mountains comprises:
a plurality of light incidence surfaces to receive light; and
a reflective surface adjacent to one of the plurality of light incidence surfaces to reflect the light, and
wherein the at least one prism mountain comprises first and second light incidence surfaces, an angle formed between the first light incidence surface and a straight line passing through an angular point of each prism mountain perpendicularly to the front surface is $\theta_{x1}$, an angle formed between the second light incidence surface and the straight line passing through the angular point of each prism mountain perpendicularly to the front surface is $\theta_{x2}$, and the $\theta_{x1}$ is in a range of about 36° to about 70°, and the $\theta_{x2}$ is in a range of about 5° to about 10°.

2. The prism sheet of claim 1, wherein the plurality of prism mountains extend in one direction.

3. The prism sheet of claim 1, wherein the first light incidence surface is connected to the second light incidence surface.

4. The prism sheet of claim 3, wherein the first light incidence surface is connected to the second light incidence surface through a curved surface interposed between the first and second light incidence surfaces.

5. The prism sheet of claim 1, wherein an angle formed between the reflective surface and the straight line passing through the angular point of each prism mountain perpendicularly to the front surface is $\theta_y$, $\theta_x > \theta_{x2}$, and $\theta_{x1} > \theta_y$.

6. The prism sheet of claim 5, wherein $\theta_y$ is within a range of about 30° to about 34°.

7. The prism sheet of claim 1, wherein the reflective surface is a curved surface having a curvature within a range of about 30° to ∞.

8. The prism sheet of claim 1, wherein each of the prism mountains has a refractive index within a range of about 1.4 to about 1.7.

9. The prism sheet of claim 1, wherein the plurality of prism mountains have at least two heights different from each other.

10. The prism sheet of claim 1, wherein the plurality of prism mountains have at least two vertical angles different from each other.

11. The prism sheet of claim 1, wherein the plurality of prism mountains having at least two heights different from each other and at least the vertical angles different from each other.

12. The prism sheet of claim 1, further comprising curved patterns randomly arranged on the front surface of the base and having an irregular corrugated shape.

13. The prism sheet of claim 2, further comprising a plurality of protrusions on the front surface of the base, the plurality of protrusions extending in a direction different from the one direction.

14. The prism sheet of claim 13, wherein the protrusions have a lenticular shape.

15. A liquid crystal display comprising:
a liquid crystal panel;
a light source provided at one side of a lower portion of the liquid crystal panel to output light;
a light guide plate provided at one side of the light source to guide the light to the liquid crystal panel; and
at least one prism sheet provided above the light guide plate to collect the light,
wherein the prism sheet comprises:
a base including a front surface and a rear surface facing the front surface, and
a plurality of prism mountains integrally formed with the base on the rear surface of the base, each of the prism mountains comprising a plurality of light incidence surfaces to receive light, and a reflective surface adjacent to one of the plurality of light incidence surfaces to reflect the light, and
wherein the at least one prism mountain comprises first and second light incidence surfaces, an angle formed between the first light incidence surface and a straight line passing through an angular point of each prism mountain perpendicularly to the front surface is $\theta_{x1}$, an angle formed between the second light incidence surface and the straight line passing through the angular point of each prism mountain perpendicularly to the front surface is $\theta_{x2}$, and the $\theta_{x1}$ is in a range of about 36° to about 70°, and the $\theta_{x2}$ is in a range of about 5° to about 10°.

16. The liquid crystal display of claim 15, wherein an angle formed between the light incidence surface adjacent to the reflective surface and a straight line passing through an angular point of each prism mountain perpendicularly to the front surface is greater than an angle formed between the reflective surface and the straight line passing through the angular point of each prism mountain perpendicularly to the front surface.

17. The liquid crystal display of claim 16, wherein angles formed between the light incidence surfaces and the straight lines passing through the angular points of each prism mountain perpendicularly to the front surface are increased in a direction toward each vertex of the prism mountains.

18. The liquid crystal display of claim 15, wherein the light guide plate comprises a light exit surface through which the light is output to the liquid crystal panel, an opposing surface facing the light exit surface, and a pattern which scatters the light formed on at least one of the light exit surface and the opposing surface.

19. The liquid crystal display of claim 18, wherein the pattern which scatters the light comprises a plurality of prism mountains extending in one direction.

* * * * *